US006195337B1

(12) United States Patent
Nyström et al.

(10) Patent No.: US 6,195,337 B1
(45) Date of Patent: Feb. 27, 2001

(54) ENCODING MODE CONTROL METHOD AND DECODING MODE DETERMINING APPARATUS

(75) Inventors: Johan Nyström, Stockholm; Tor Björn Minde, Gammelstad; Fredrik Jansson, Sundbyberg, all of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 08/845,385

(22) Filed: Apr. 25, 1997

(30) Foreign Application Priority Data

Apr. 26, 1996 (SE) ................................... 9601606

(51) Int. Cl.⁷ .......................... H04L 12/28; H04B 7/185; H04J 3/16
(52) U.S. Cl. .......................... 370/252; 370/318; 370/465
(58) Field of Search .................................. 370/333, 332, 370/252, 347, 321, 337, 318, 465, 468; 375/222; 371/2.1, 41, 72; 374/56.1

(56) References Cited

U.S. PATENT DOCUMENTS

| | | | |
|---|---|---|---|
| 4,710,925 | * 12/1987 | Negi | 371/5.5 |
| 5,001,776 | * 3/1991 | Clark | 445/226.1 |
| 5,353,373 | 10/1994 | Drogo de Iacovo et al. | |
| 5,375,123 | * 12/1994 | Andersson et al. | 370/95.1 |
| 5,396,516 | * 3/1995 | Padovani et al. | 370/465 |
| 5,469,527 | 11/1995 | Drogo de Iacovo et al. | |
| 5,541,955 | * 7/1996 | Jacobsmeyer | 375/222 |
| 5,603,096 | * 2/1997 | Gilhousen et al. | 370/468 |
| 5,604,739 | * 2/1997 | Buhrgard et al. | 370/468 |
| 5,701,294 | * 12/1997 | Ward et al. | 370/465 |
| 5,715,243 | * 2/1998 | May | 370/465 |
| 5,790,533 | * 8/1998 | Burke et al. | 370/465 |
| 5,802,105 | * 9/1998 | Tiedemann, Jr. et al. | 370/252 |
| 5,822,315 | * 10/1998 | De Seze et al. | 370/468 |
| 5,881,053 | * 3/1999 | Kimball | 370/468 |
| 5,909,434 | * 6/1999 | Odenwalder et al. | 370/468 |
| 5,982,766 | * 11/1999 | Nystrom et al. | 370/347 |

FOREIGN PATENT DOCUMENTS

| | | |
|---|---|---|
| 0 668 561 | 8/1995 | (EP). |
| WO94/07313 | 3/1994 | (WO). |
| WO97/13388 | 4/1997 | (WO). |

OTHER PUBLICATIONS

Abstract, Yayoi, Sato, "High Efficiency Voice Encoder", Patent No. 63–276115, Oct. 5, 1990.

Dunlop, J. et al., "Estimation of the Performance of Link Adaptation in Mobile Radio", 1995 IEEE 45th Vehicular Technology Conference—Countdown to the Wireless Twenty–First Century, VTC–95, pp. 326–330 1995.

Sundberg, Carl–Erik W., "Quality of Service and Bandwidth Efficiency of Cellular Mobile Radio with Variable Bit–Rate Speech Transmission", IEEE Trnsactions of Vehicular Technology, v. 32, No. 3, pp. 211–217, 1983.

Yuen, E. et al., "Variable Rate Speech and Channel Coding for Mobile Communication", 1994 IEEE 44th Vehicular Technology Conference—Creating Tomorrow's Mobile Systems, VTC–95, pp. 1709–1712, 1994.

(List continued on next page.)

Primary Examiner—Chau Nguyen
Assistant Examiner—Phuongchau Ba Nguyen
(74) Attorney, Agent, or Firm—Burns, Doane, Swecker & Mathis, L.L.P.

(57) ABSTRACT

In a digital cellular radio communication system, a base station selects a speech/channel encoding mode based on measurements of the local radio environment. The mobile station determines the selected mode by trial decoding possible modes to find the most probable mode and uses the same mode for transmission to the base station on the return link. The coding gain/loss obtained by this mode switching may be used to adjust the output power of transmitters, thereby reducing the overall interference level in the system.

24 Claims, 10 Drawing Sheets

OTHER PUBLICATIONS

J. Dunlop et al., "Estimation of the Performance of an Adaptive Air Interface in Mobile Radio," Alcatel Radiotelephone, pp. 1–5.

D.J. Goodman et al., "Quality of Service and Bandwidth Efficiency of Cellular Mobile Radio with Variable Bit–Rate Speech Transmission, " IEEE (1983).

J. Irvine et al., "Implementation Considerations for Gross Rate Link Adaptation," IEEE, pp. 1766–1770 (1996).

E. Le Strat et al., "Distance Based Dynamic Adaptation of the Air Interface in TDMA," Alcatel Mobile Communication France, pp. 208–215.

Y. Sato, "High Efficiency Voice Encoder", NEC Corporation, Japanese Abstract 63–276115, May 10, 1990.

\* cited by examiner

ENCODING MODE CONTROL METHOD AND DECODING MODE DETERMINING APPARATUS

TECHNICAL FIELD

The present invention relates to an encoding mode control method and a decoding mode determining apparatus in a digital cellular radio communication system, as well as a power control method and system that utilize the inventive idea.

BACKGROUND

In present digital cellular communication systems a speech encoder rate is chosen at call setup and is fixed throughout the call. This strategy is used in the D-AMPS and GSM systems. However, this strategy gives good performance with respect to channel robustness and speech quality over only a limited range of channel conditions.

In CDMA systems, such as IS-95, there is a variable speech and channel encoder scheme, but the speech and channel coder mode decision for one link is based on speech signal characteristics and is independent of the mode of a return link.

It has also been suggested as described in Dunlop J, Irvine J and Cosimini P. "Estimation of the Performance of Link Adaptation in Mobile Radio", IEEE Vehicular Technology Conference, VTC-95, Chicago 1994, to use dynamically changing encoding modes with different mixes of speech/channel encoding suitable for different radio environments. However, these methods are too slow, since they need to keep signaling overhead as low as possible.

WO 94/07313 assigned to ANT NACHRICHTENTECHNIK GMBH, and Yuen E, Ho P and Cuperman V, "Variable Rate Speech and Channel Coding for Mobile Communication", IEEE Vehicular Technology Conference, VTC-95, Stockholm 1994 describe systems in which a receiver may request a mode change from a transmitter over a dedicated back channel.

It would be desirable to dynamically allocate speech and channel coder rates depending upon local radio conditions on a frame by frame basis in order to achieve a close to optimum performance in a larger range of conditions, and to let the coding mode of one link control the allocation of coding mode for the return link.

SUMMARY

An object of the present invention is to provide an encoding mode control method that dynamically adapts the coding rate to prevailing radio conditions on a frame by frame basis and allows at least one party to base its transmission mode decision at least partially on the mode received on the other link.

Another object of the present invention is to provide a decoding mode determining apparatus that synchronizes the receiver decoding mode with the transmitter encoding mode.

A further object is a power control method and system based on these mode switching capabilities.

Briefly, the present invention achieves the above objects by monitoring the local radio environment around the transmitter and dynamically selecting a speech-/channel encoding rate combination suitable for the current radio environment, all combinations having the same total gross bit rate (the total bit rate available for information transfer on a given channel if no channel protection is provided). In a preferred embodiment the receiver trial decodes all possible speech/channel coding combinations and selects the most probable one for actual speech decoding. Finally the receiver selects the same encoding mode for the return link to the transmitter. This encoding scheme is very fast (frame by frame) and requires no handover. Furthermore, the coding gain/loss obtained by this mode switching may be utilized for power adjustments that reduce the overall interference level of the communication system.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention will be described with reference to TDMA systems, in particular to the European GSM system. However, it is to be understood that the same principles may be used also for other TDMA systems, such as the American system in accordance with the standards IS-54 and IS-136, as well as FDMA systems and CDMA systems, for example the CDMA system in accordance with the standard IS-95.

The basic feature of the present invention is mode switching. This feature will be described in the next section "MODE SWITCHING". The section "POWER CONTROL" is an example of an important application where this feature is used.

Mode Switching

Figure 1:
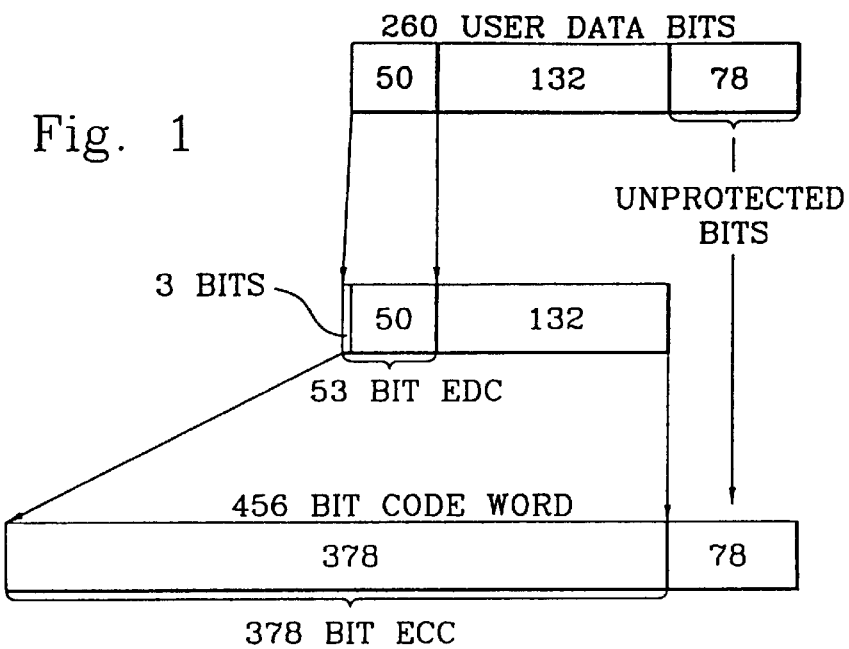
FIG. 1 is a diagram illustrating channel encoding in GSM.

FIG. 1 illustrates the data format of a speech frame in the European GSM system. The speech frame consists of 260 bits of user data (encoded speech). These 260 bits have been divided into three different classes depending on their sensitivity to bit errors. The more sensitive bits are provided with more error protection than the less sensitive bits. The 50 most sensitive bits are protected first with a 3 bit errors detecting code (EDC), and then the resulting 53 bits along with the 132 next most sensitive bits are encoded with an error correcting code (ECC) up to 378 bits. The remaining 78 bits are transmitted without channel protection of any kind. Thus, the final code word representing the original speech frame will consist of 456 bits.

At the receiver the decoder extracts the 78 unprotected bits and performs error correction on the remaining 378 bits. Errors among the 78 unprotected bits are neither detected nor corrected. Errors among the 132 channel protected bits are rare due to the error correction, but when they occur they are impossible to detect. Finally, errors in the 50 most sensitive bits are likely to be detected by the 3 bit error detection code.

Figure 2:
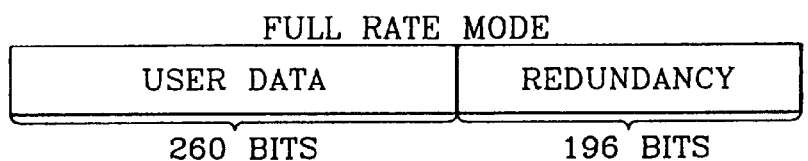
FIG. 2 is a diagram illustrating three coding modes having different data protection but the same gross bit rate.
Figure 2:
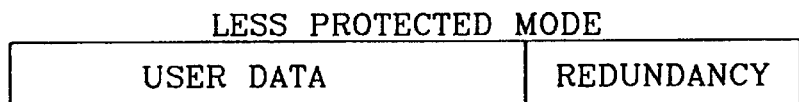
Figure 2:

As illustrated in FIG. 2 this channel encoding scheme for a GSM full rate channel implies that a certain amount of redundancy is added to the user data that is to be transmitted. However, within the same total available gross bit rate it is possible to use other proportions between user data and redundancy. Thus, if radio conditions are good it may be possible to reduce the data protection and thereby the redundancy. Since the total gross bit rate is assumed to be constant, this means that more bits are available for user data. This is illustrated by the data block in the middle of FIG. 2. Since more user data bits now are available, a more accurate speech encoding algorithm (that requires more bits) may be used, thereby increasing the quality of the speech decoded at the receiver. On the other hand, if the radio conditions are poor it may be necessary to increase the data protection. This leads to an increase in the number of redundant bits, and therefore to a reduction of the number of bits used for speech encoding. In this case a less accurate speech encoding method has to be used. A data block representing such a more protected mode is shown at the bottom of FIG. 2. The advantage of such a mode is that the added data protection increases the probability of correctly receiving and decoding the encoded speech. The argument for this is that it is preferable to correctly receive speech encoded with somewhat lower accuracy than to incorrectly receive speech encoded with higher accuracy. The perceived speech quality at the receiver will still be better in the first mentioned case.

Figure 3:
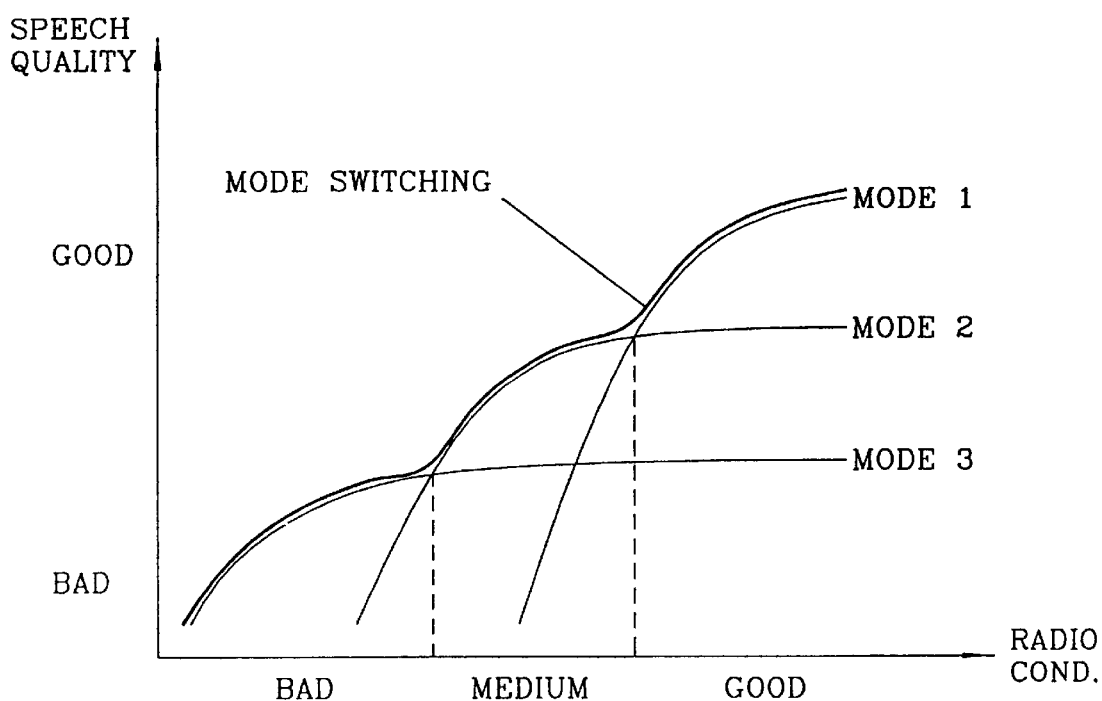
FIG. 3 is a diagram illustrating the advantages of mode switching in accordance with the present invention.

FIG. 3 illustrates how mode switching in accordance with the present invention improves performance. The curve denoted MODE 1 represents the characteristics of a mode with high quality speech encoding and low redundancy. This mode gives good perceived speech quality at the receiver when the radio conditions are good. As the radio conditions degrade the perceived speech quality will be reduced due to frequently occurring bit errors. Here it would be better to use MODE 2, which uses a more compact speech coding algorithm, but protects the transmitted bits better from errors caused by the channel. As the radio conditions degrade further, the speech encoding algorithm is once again changed to MODE 3, which produces few user data bits and protects them even better against the deteriorating channel. Thus, if mode switching is used the optimum portions of the curves representing MODE 1, MODE 2 and MODE 3 may be used, as indicated by the thick solid line in FIG. 3.

From the above discussion it is clear that mode switching would be a desirable feature of a cellular radio communication system. However, before this feature can be implemented it is necessary to find a way to synchronize the encoder in the transmitter with the decoder in the receiver. In other words, the receiver must know which mode to decode after a mode switch in the transmitter. Furthermore, it is usually desirable to have the receiver changed to the same encoding mode on the return link from the receiver to the transmitter (one reason for this is that the path loss is the same in both directions). Methods for such a mode synchronization will now be described with reference to FIGS. 4–9.

Figure 4:
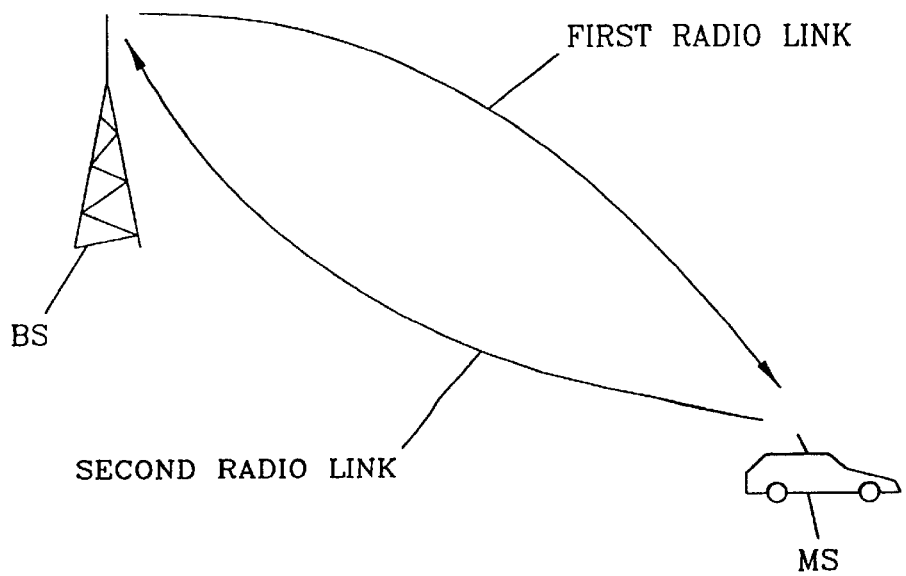
FIG. 4 illustrates a context in which the present invention may be used.

FIG. 4 illustrates a typical scenario. A base station BS transmits speech data to a mobile MS over a first radio link. Mobile MS transmits speech data back to base station BS over a second radio link. Base station BS continuously monitors the local radio environment around the station. This radio environment may be effected by, for example, propagation fading, shadow fading, Rayleigh fading, interference situations, system load and/or received signal strength. In the GSM system a base station (and also the mobile station) has access to measurements like the RxQual and RxLev parameters, which estimate the received bit error probability and received signal strength, respectively. Based on one or several of such parameters base station BS may form a measure to decide which encoding mode to use on the first radio link. Base station BS instructs the speech encoder to switch to the corresponding speech encoding mode and also instructs the channel encoder to switch to the corresponding channel encoding mode. Here it is assumed that the speech encoder is capable of handling different encoding rates, i.e. a variable rate encoder. Alternatively it may comprise an embedded encoder (see) U.S. Pat. No. 5,353,373 and U.S. Pat. No. 5,469,527 both of which are assigned to assigned to Societa Italiano per l'Esercizio delle Telecomunicazioni P.A. such that the channel encoder may remove information from a fixed rate speech encoded data stream for obtaining different speech encoding modes.

Mobile station MS receives the transmitted code word, which may be corrupted by the first radio link. In order to be able to perform proper speech decoding at mobile station MS, the channel decoder has to deliver proper user data to the speech decoder. Thus, the receiver has to decide which mode actually was used by base station BS. This can be done in several ways.

Figure 5:
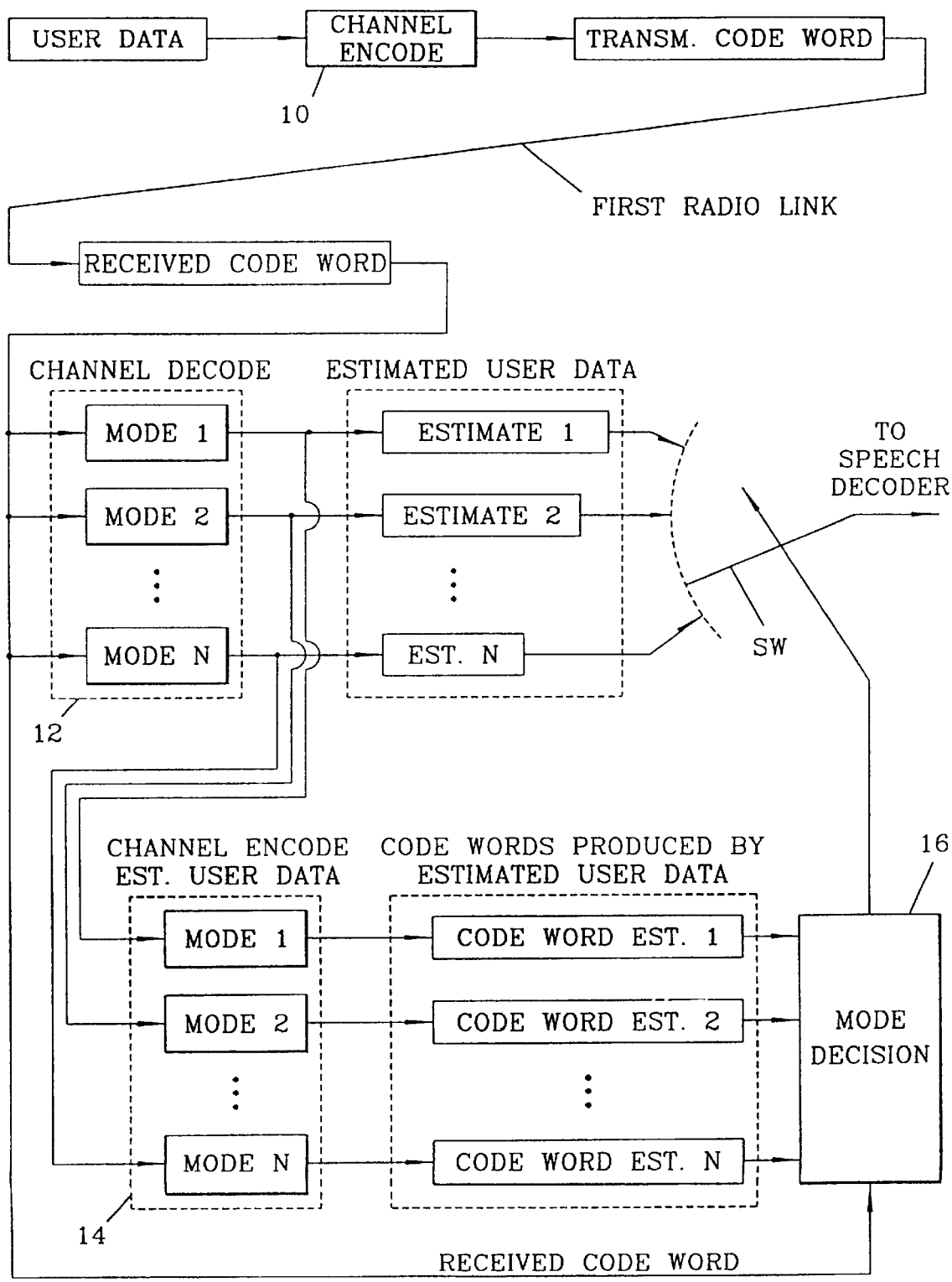
FIG. 5 is a combined block and data diagram illustrating a preferred process for identifying an encoding mode at the receiving end.

FIG. 5 illustrates a preferred embodiment of a coding mode identification method. In this method the (possibly corrupted) received code word is channel decoded in every possible mode 1, . . . , N by performing the usual decoding steps for each respective mode. This step is represented by block 12. The result is N estimates of the originally transmitted user data, one estimate for each mode.

In the next step these estimates are used for channel encoding in block 14. The purpose of this channel encoding is to produce code word estimates corresponding to each user data estimate. These code word estimates are used in a mode decision represented by block 16. This mode decision is based on a comparison of each code word estimate with the actually received code word. The code word estimate that best matches (for example, has the fewest differing bits) the received code word is considered to be the correct code word, and the corresponding user data estimate is chosen by a switch SW and transferred to the speech decoder. The speech decoder may switch to the corresponding speech decoding mode by measuring the length of the received user data. As an alternative block 16 may also control the speech decoding mode. When mobile station MS has determined the received mode it may be synchronized with base station BS by switching to the same encoding mode on the second radio link.

Blocks 12, 14 and 16 in FIG. 5 are preferably implemented by one or several micro processors or micro/signal processor combinations.

Error protection (detection and/or correction) schemes may also be cascaded in any number of steps.

Figure 6:
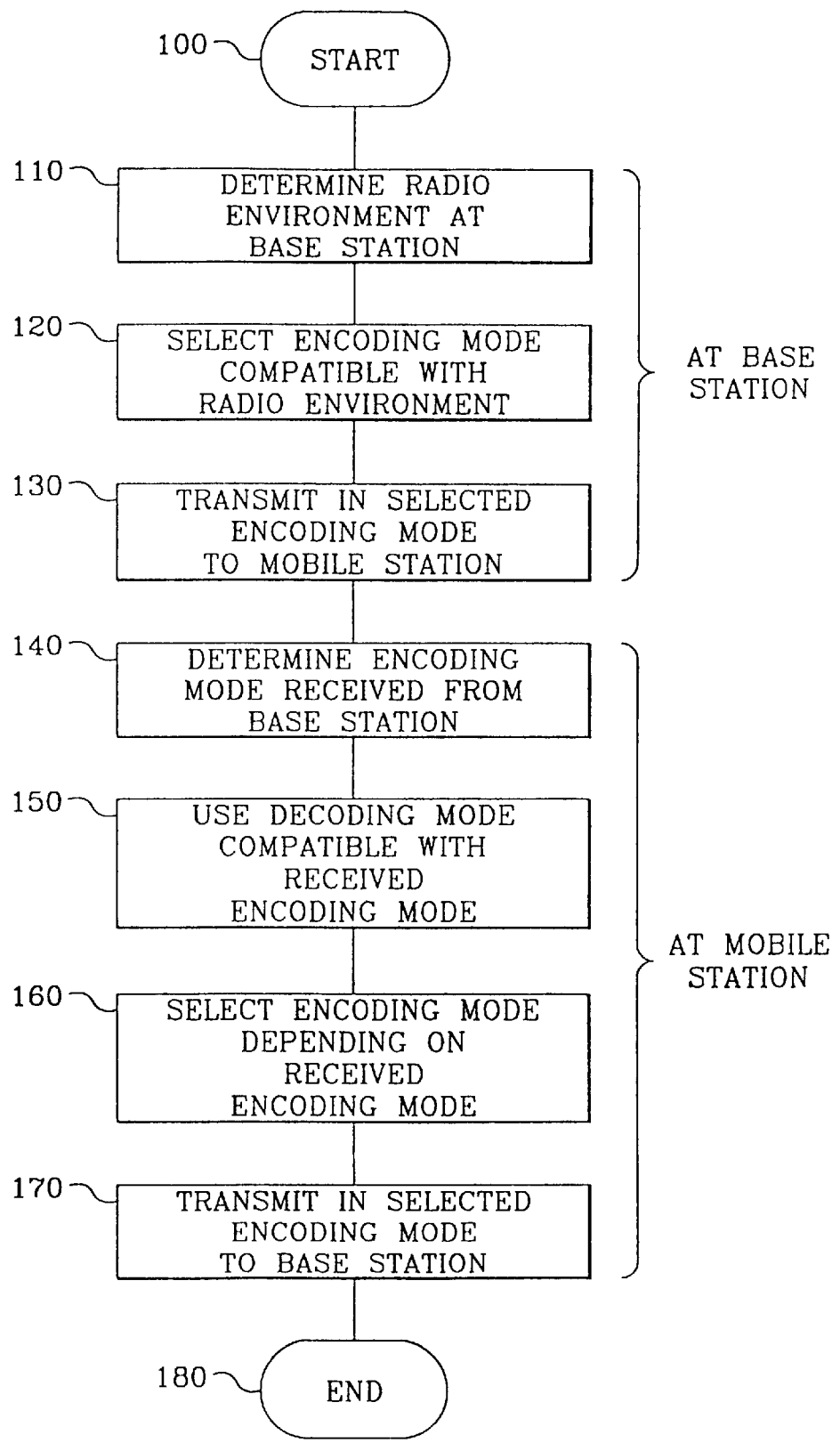
FIG. 6 is a flow chart illustrating the method in accordance with the present invention.

The method in accordance with the present invention is summarized in the flow chart in FIG. 6. In step 110 base station BS determines the local radio environment. In step 120 it selects an encoding mode compatible with that environment. In step 130 it transmits to the mobile station in the selected encoding mode. In step 140 mobile station MS determines the received encoding mode, for example in accordance with the method described with reference to FIG. 5. In step 150 mobile station MS decodes received data using a decoding mode corresponding to the received encoding mode. In step 160 it selects an encoding mode for the second radio link to base station BS based on the previous mode decision. Usually mobile station MS will use the same mode on the second radio link as base station BS used on the first radio link. Finally, in step 170 mobile station MS will transmit in the selected encoding mode on the second radio link.

Figure 7:
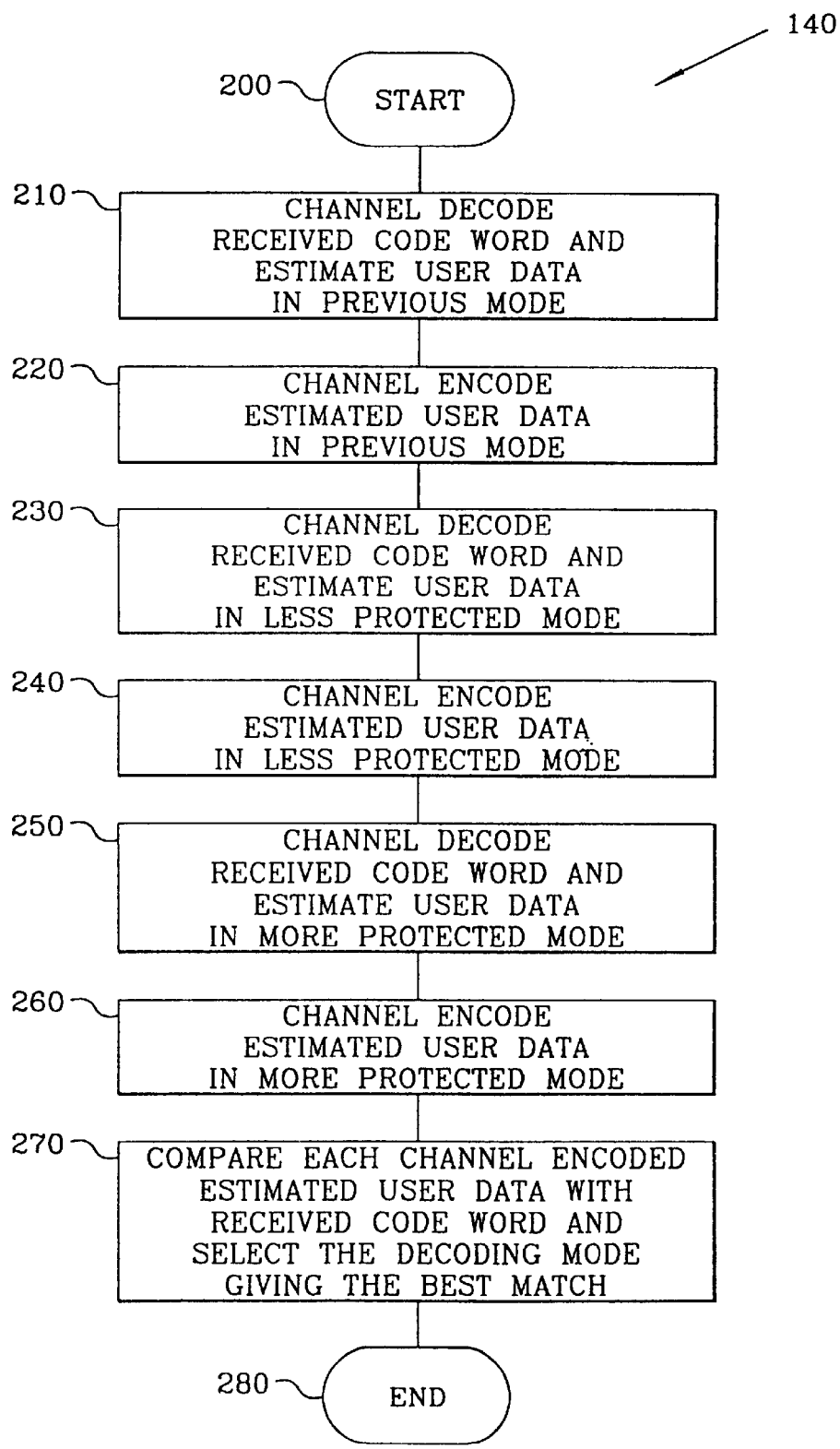
FIG. 7 is a flow chart illustrating an embodiment of the encoding mode determining step in FIG. 6.

FIG. 7 shows a flow chart of a preferred embodiment of mode identification step 140 in FIG. 6. This method corresponds to the method illustrated in FIG. 5, but in this case only three modes will be examined at the receiving end, namely the mode received in the previous frame (steps 210, 220), the neighbor mode having less channel protection (steps 230,240) and the neighbor mode having more channel protection (steps 250, 260). The mode giving the best match is selected (step 270). This embodiment reduces the workload of the system by reducing the number of modes that have to be trial decoded and also reduces the number of mode changes.

Figure 8:
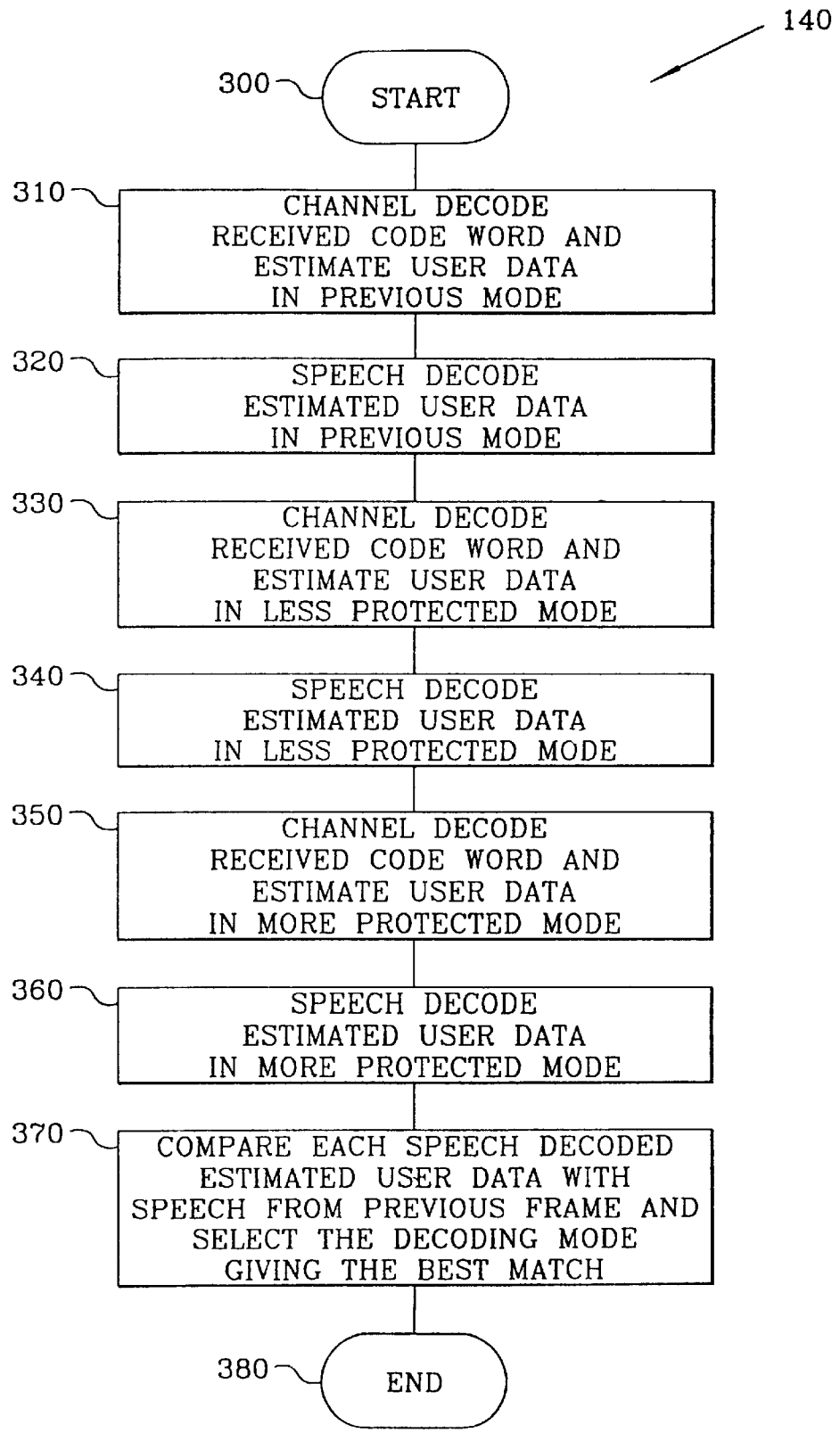
FIG. 8 is a flow chart of another embodiment of the encoding mode determining step in FIG. 6.

FIG. 8 illustrates a more elaborate mode identification method. As in the method in accordance with FIG. 7 only three modes are examined (steps 310–360). However, in this case the received frame is not only channel decoded, but also speech decoded in all three modes. In step 370 the three decoded speech frames are compared with the previous speech frame, and the decoding mode giving the best match is selected as the current mode. Here use is made of the fact that speech signals are strongly correlated in time. For example, the spectral characteristics of the previous frame may be compared to the spectral characteristics of the three decoded speech frames.

A less complex mode identification method comprises using the error detection code bits to decide which mode to use. If the error detection bits indicate that there are no errors for one of the modes, this is probably the correct mode.

Figure 9:
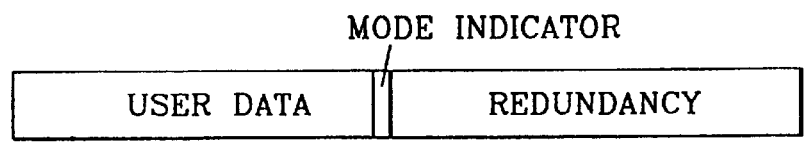
FIG. 9 is a data diagram illustrating another method of conveying encoding mode information to a receiver.

In the above examples the received mode has been detected by trial decoding of several mode candidates. Another possibility would be to convey the mode information directly in a mode code word separated from the data code word, either in the same transmitted frame or in a separate information channel. Mobile station MS would then be able to decide which mode to use by decoding the mode code word first and then only channel and speech decode the indicated mode. A typical format of such a transmitted code word is illustrated in FIG. 9. This method has the advantage of being less complex, but also has the disadvantage of taking up part of the available band width for signalling purposes.

In the above description it has been assumed that base station BS bases its mode decision on measured characteristics of the local radio environment and that mobile station MS switches to the same mode. In this case base station BS is considered the master and mobile station MS is considered the slave. This seems reasonable, since the base station usually has access to a lot of system and radio statistics, and it also leaves the implementation of the mobile station quite simple, since no measurements for mode switch purposes have to be made in the mobile station.

However, in a more symmetrical system it is possible to let both base station and mobile station base their transmit mode decisions partly on the measured local radio environment and partly on the received mode. Thus, in such an embodiment these two parameters are weighted together for a final decision. Also in this embodiment it is possible to let the base station be the master by giving more weight to the radio environment measurements at the base station than at the mobile station.

Some of the merits of the invention are summarized below:

- It gives better overall perceived speech quality over a larger range of radio signal/interference conditions than the prior art.
- It gives a fast implicit way of requesting mode changes that does not necessarily require transmission of a special mode message. A symmetry is possible between base and mobile station giving roughly the same perceived speech quality for both parties.
- It gives the possibility of letting only one party decide upon mode changes.
- It gives the possibility of having the same modes in both directions in spite of the fact that modes are changed dynamically.
- In GSM neither the base station controller (BSC) nor the mobile switching centre (MSC) need to participate in the mode decision (no handover required).
- In case of an embedded encoder neither the BSC nor the MSC have to be informed of the actual mode changes.

Power Control

An important feature of the above described mode switching methods is that a coding gain/loss is obtained by the different encoding modes. This coding gain/loss may be used to adjust the output power of a transmitter, as will now be described.

Figure 10:
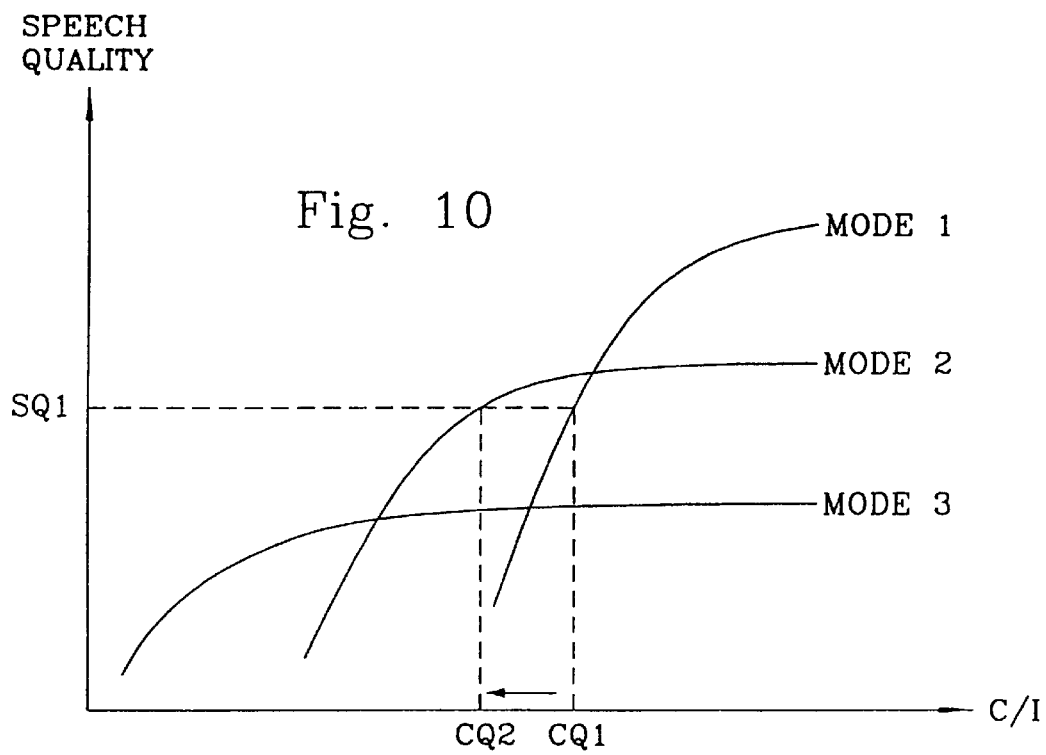
FIG. 10 is a diagram illustrating the concept of output power adjustment, which is an important application of the present invention.

FIG. 10 is a diagram illustrating the concept of output power adjustment. Assume that the radio conditions have been such that MODE 1 has previously been used for encoding. Furthermore, assume that the radio conditions have now become worse and may be described by a C/I level CQ1. If MODE 1 is maintained this would give a speech quality level SQ1. It is assumed that level SQ1 is still an acceptable level. Thus, it is actually not absolutely necessary to switch to MODE 2, although this mode would give a more optimal speech quality. However, the same speech quality SQ1 may also be obtained by switching to MODE 2 and using the resulting coding gain to reduce the transmitting power, as indicated by the arrow. The reduced output power will reduce C/I to CQ2, but the obtained speech quality will still be SQ1 since the new encoding mode is MODE 2. If every transmitter in the TDMA system uses the coding gain obtained by mode switching to decrease output power the overall C/I level will increase, thereby improving the performance of the whole system.

Figure 11:
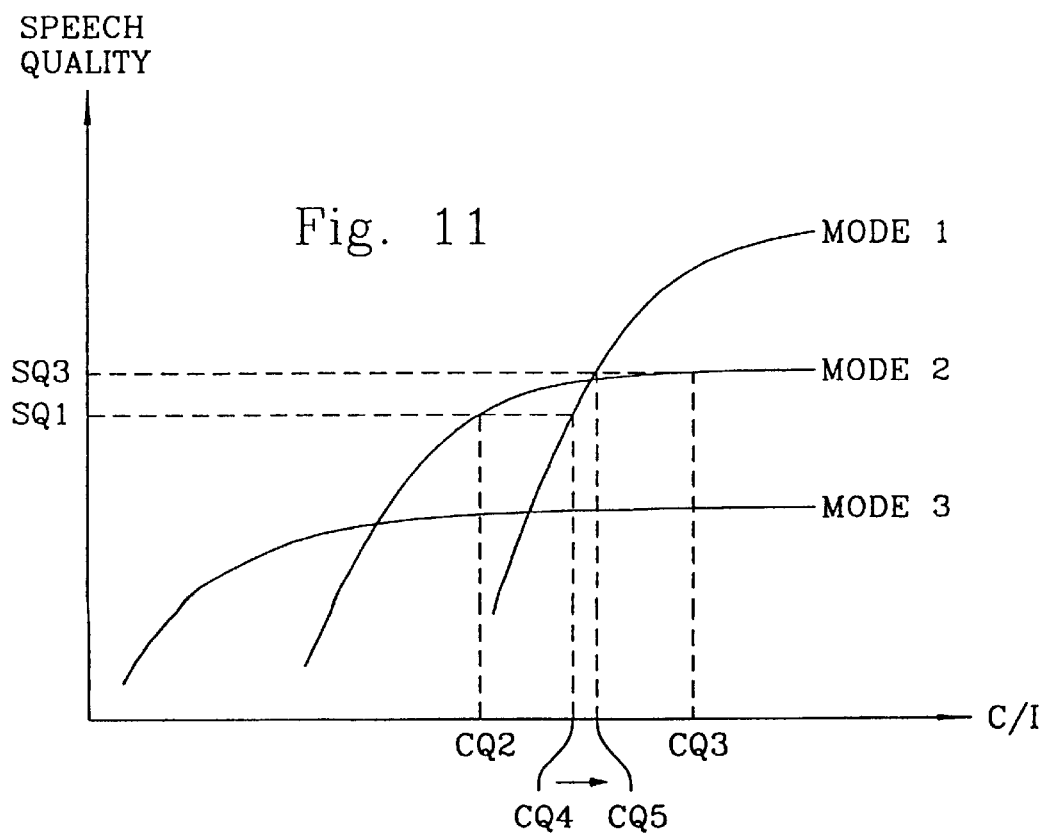
FIG. 11 is a diagram illustrating mode switching combined with output power adjustment.

FIG. 11 is a diagram illustrating mode switching combined with output power adjustment in the reverse situation, namely when the radio conditions improve. Assume that MODE 2 has been used at a C/I level CQ2 and has given speech quality SQ1. Furthermore, assume that radio conditions have now improved to C/I level CQ3. If the mode remained the same the speech quality would slide up the curve MODE 2 to level SQ3. A mode switch to MODE 1 would only give the original speech quality SQ1 at C/I level CQ4. However, if this mode switch is combined with a slight output power increase (indicated by the small arrow) C/I would increase from CQ4 to CQ5 and the speech quality would slide up the curve MODE 1 to the same level SQ3. However, note that in this case speech quality SQ3 may be obtained at the lower C/I level CQ5 rather than the higher level CQ3 that is associated with MODE 2.

Figure 12:
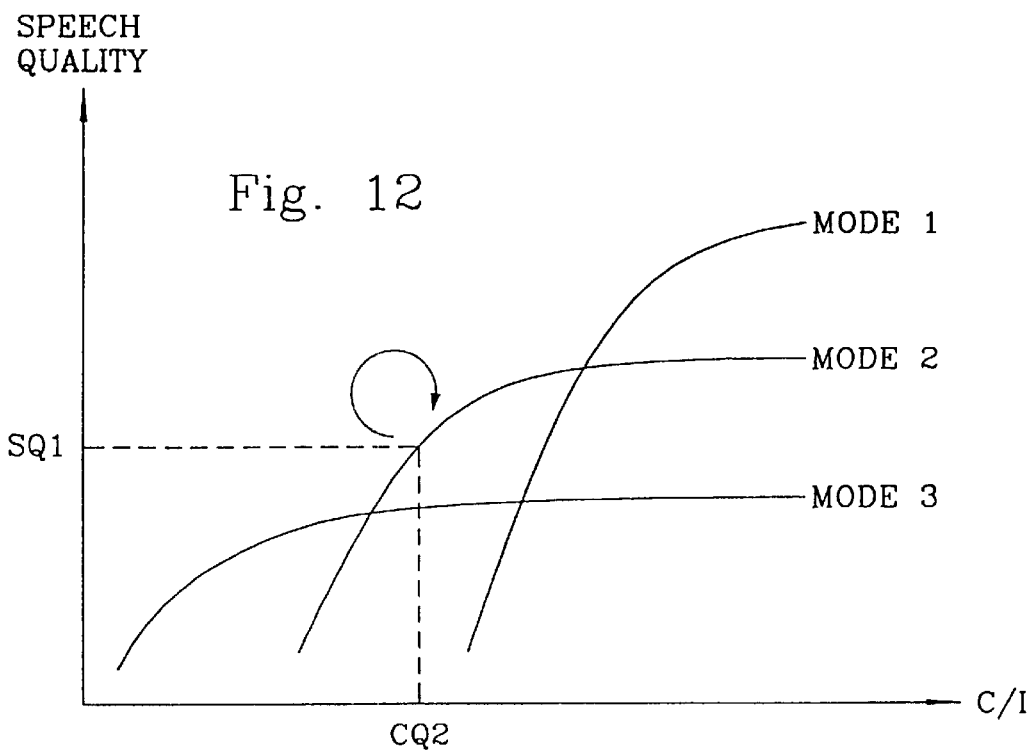
FIG. 12 is a diagram illustrating fine tuning of output power within the same encoding mode.

FIG. 12 is a diagram illustrating fine tuning of output power within the same encoding mode. As before SQ1 is considered an acceptable speech quality level lying on curve MODE 2 and being associated with C/I level CQ2. If radio conditions improve slightly the C/I level will increase slightly. If the output power is not changed the speech quality would slide up the curve MODE 2 to give a slightly better perceived speech quality. However, speech quality level SQ1 was already acceptable, which implies that the C/I increase may be used to slightly decrease output power instead, thereby contributing to better system performance. Thus, the output power may be reduced to bring the speech quality level back to SQ1. Similarly, if the radio conditions become slightly worse, so that the speech quality would slide down the curve MODE 2, the output power may be slightly increased to compensate for the reduced C/I level. These two cases are represented by the curved arrow in FIG. 12.

Figure 13:
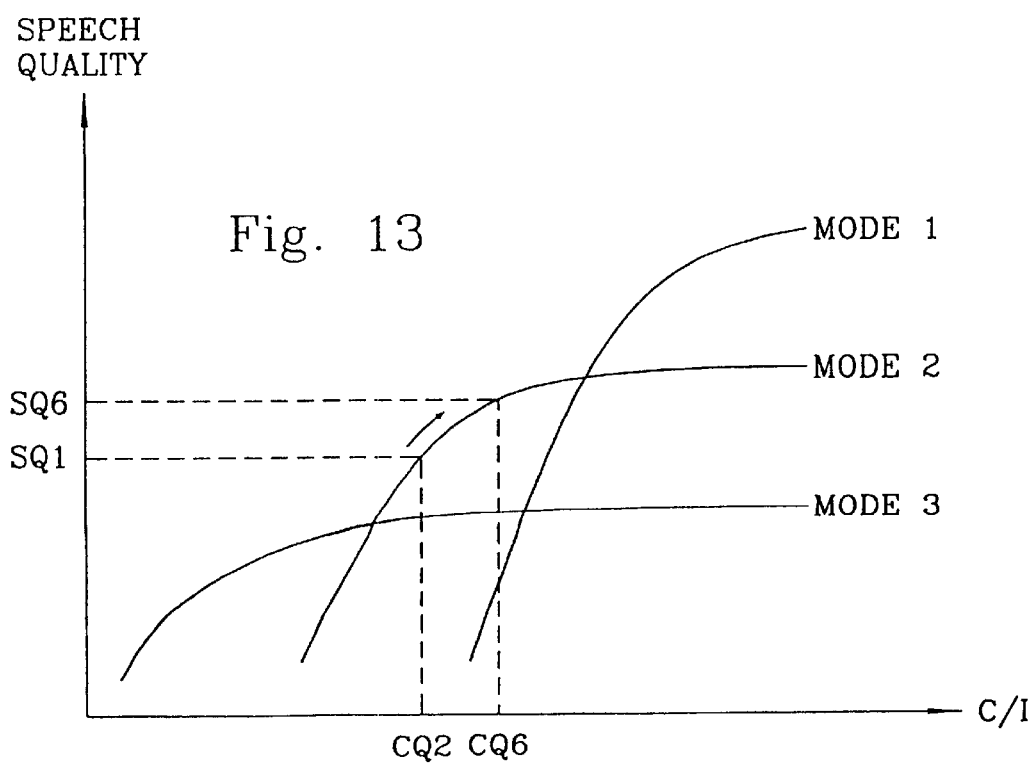
FIG. 13 is another diagram illustrating fine tuning of speech quality within the same encoding mode.

FIG. 13 is another diagram illustrating fine tuning of speech quality within the same encoding mode. As in FIG. 12 speech quality SQ1 is obtained in MODE 2 at C/I level CQ2. Furthermore it is assumed that the transmitter transmits at its minimum output power. Thus, if radio conditions improve to a C/I level CQ6 it is not possible to decrease the output power further as in FIG. 12. Instead the output power is kept constant, which will result in an improved speech quality level SQ6 by letting the speech quality slide up the curve MODE 2.

Figure 14:
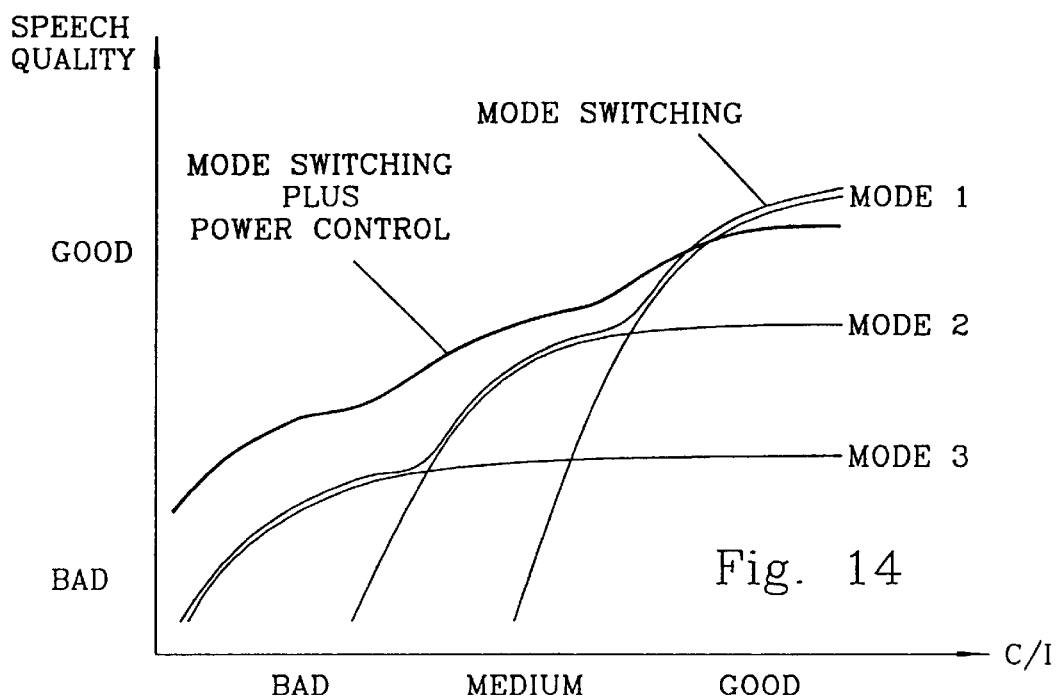
FIG. 14 is a diagram qualitatively illustrating the benefits of combined mode switching and output power adjustment.

FIG. 14 is a diagram qualitatively illustrating the benefits of combined mode switching and output power adjustment. Generally speaking the effect of combined mode switching and output power adjustment, as compared to only mode switching, is to somewhat decrease the speech quality for the less channel protected modes and to increase the speech quality of the more channel protected modes, thus giving a more even speech quality over a large range of C/I levels.

Figure 15:
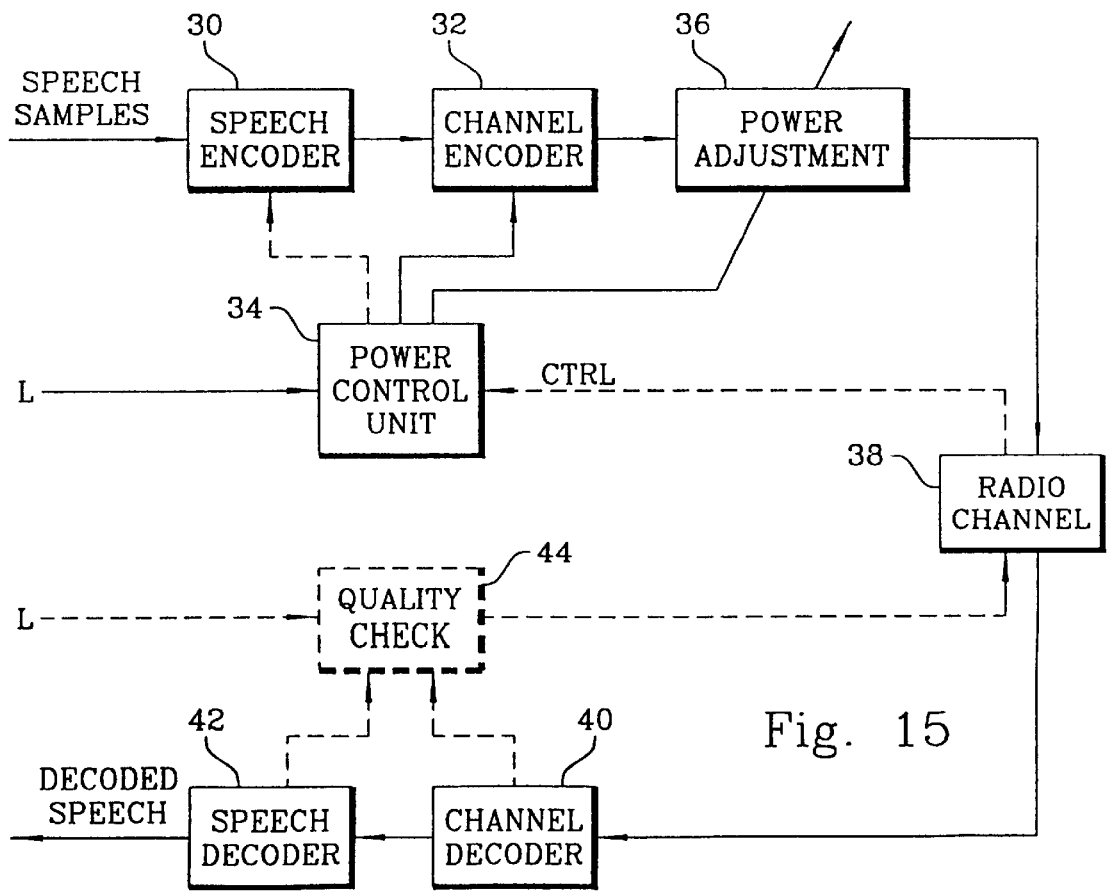
FIG. 15 is a simplified block diagram of a power control system.

FIG. 15 is a simplified block diagram of a power control system operating in accordance with the described principles. In order to simplify the description only blocks that are essential to the present invention have been included.

A speech encoder 30 receives and encodes speech samples. Speech encoder 30 may be a variable rate or embedded speech encoder (a variable rate encoder may also be implemented by switching between several fixed rate encoders). Encoded speech is forwarded to a channel encoder 32, which has a channel encoding mode corresponding to each speech encoder mode. The output from channel encoder 32 fits into a constant gross bit rate.

A power control unit 34 controls channel encoder 32 to operate in the proper channel encoding mode. Power control unit 34 also controls speech encoder 30 if it is of variable rate type (this is indicated by the dashed line between power control unit 34 and speech encoder 30). If speech encoder 30 is of the embedded type it is not necessary to control it, since it will always deliver a constant rate bit stream. In this case channel encoder will truncate necessary bits as required by the selected channel encoding mode. Such an embodiment is especially useful if power control unit 34 and speech encoder 30 are in different locations in the TDMA system and fast communication between them is difficult.

Blocks 30, 32, 34 are typically implemented as micro or micro/signal processor combinations.

Power control unit 34 also controls a power adjustment unit 36, typically an adjustable power amplifier, to increase or decrease the output power from the transmitter depending on the selected encoding mode.

The mode decision in power control unit 34 is based on local information L, such as measured signal strength, C/I, traffic or system load, etc. Optionally an inband control channel, such as the above described CTRL channel, may be used as a back channel to convey quality information, such as the decoded bit error rate, from the receiving end back to the transmitting end.

Basic power adjustments may be associated with each mode. These basic adjustments may be pre-calculated off-line and stored for later use. These basic power adjustments may be performed when there are drastic changes in radio conditions, for example due to shadowing. When there are only small changes in radio conditions only fine tuning of the output power around corresponding basic power levels is performed. This fine tuning adapts the output power to keep the received speech quality at an essentially constant level in the current mode.

After transmission over the radio channel 38 the received signal is decoded in channel decoder 40 and speech decoder 42. An optional quality check unit 44 receives quality information from channel decoder 40 and speech decoder 42. Locally measured information L (signal strength, C/I, etc.) may also be forwarded to quality check unit 44. After evaluation a speech quality measure, for example an estimated decoded bit error rate, is transmitted back to the transmitter on the back channel CTRL.

Figure 16:
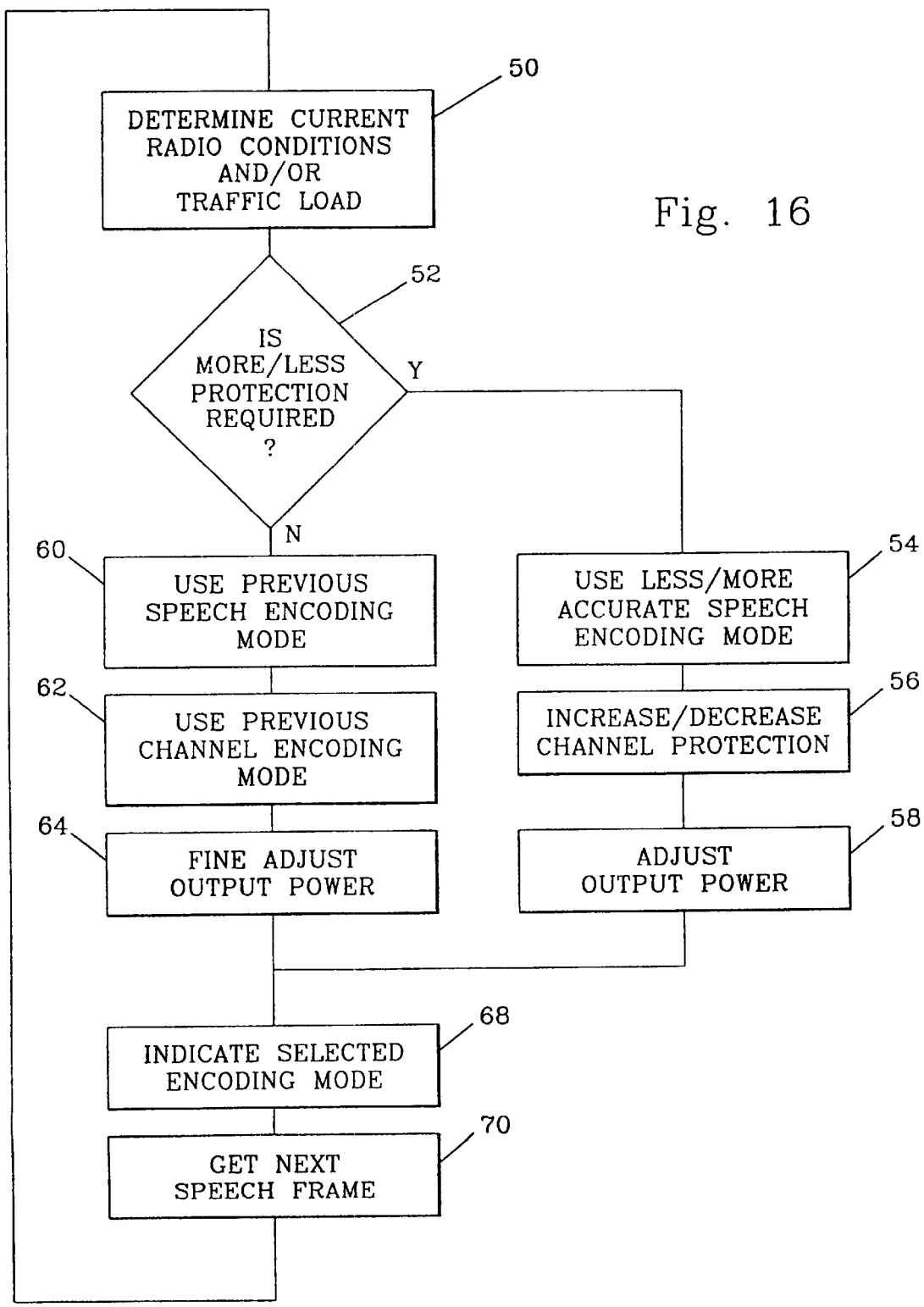
FIG. 16 is a flow chart illustrating a power control method.

FIG. 16 is a flow chart illustrating an example of the power control method. The power adjustments are radio environment controlled as described above. Step 50 determines the current radio environment. Step 52 determines whether a mode change is required. If a change is necessary step 54 switches to another speech encoding mode and step 56 switches to a corresponding channel encoding mode. Thereafter step 58 performs the corresponding power adjustment. If no mode change is necessary in step 52, the old speech and channel encoding modes are used in steps 60 and 62, respectively. Although the mode has not changed a fine adjustment of the output power may still be performed as described above. In step 68 the current mode is indicated. Step 70 gets the next speech frame and returns to the beginning of the flow chart.

In the above description it has not been specified whether the transmitter is a base station or a mobile station. Since both stations include both a transmitter and a receiver this means that the system may be symmetrical. However, typically more information is available in one of the stations, usually the base station, which implies that it is natural to let this station control both its own as well as the other station's transmission mode.

The described power control method leads to several advantages, namely:

A better TDMA system capacity due to the reduced interference level.

Signaling may be very fast, involving only the base station and the mobile station and not the base station controller (GSM) or mobile services switching center (no handover required).

The mode control algorithms and settings may vary between cellular operators, thus giving different service characteristics. This introduces a tool for tailoring the offered services towards different segments of the market.

It will be understood by those skilled in the art that various modifications and changes may be made to the present invention without departure from the spirit and scope thereof, which is defined by the appended claims.

Citations

[1] Dunlop J, Irvine J and Cosimini P. "Estimation of the Performance of Link Adaptation in Mobile Radio", IEEE Vehicular Technology Conference, VTC-95, Chicago 1994.
[2] WO 94/07313 assigned to ANT NACHRICHTEN-TECHNIK GMBH
[3] Yuen E, Ho P and Cuperman V, "Variable Rate Speech and Channel Coding for Mobile Communication", IEEE Vehicular Technology Conference, VTC-95, Stockholm 1994.
[4] U.S. Pat. No. 5,353,373 assigned to Societa Italiano per l'Esercizio delle Telecomunicazioni P. A.
[5] U.S. Pat. No. 5,469,527 assigned to Societa Italiano per l'Esercizio delle Telecomunicazioni P. A.

What is claimed is:

1. An encoding mode control method in a digital cellular radio communication system having traffic channels, at least one of which are associated with a set of encoding modes, each mode having a different mix of speech encoder bit rate and data protection bit rate but the same total available gross bit rate, the method comprising:
   determining a first measure of the local radio environment at a transmitting end of a first link;
   selecting, at the transmitting end, a transmitter encoding mode from the set that at least partially depends on the first measure;
   transmitting in the selected transmitter encoding mode to the receiving end of the first link;
   trial decoding, at the receiving end, the received signal in several receiver decoding modes corresponding to the transmitter encoding modes;
   selecting, at the receiving end, the receiver decoding mode that is most likely to give the best decoded speech quality as the current receiver decoding mode;
   selecting, at the receiving end, a receiver encoding mode from the set that at least partially depends on the selected receiver decoding mode; and
   transmitting, from the receiving end, in the selected receiver encoding mode on a second link using another such channel from the receiving end to said transmitting end.

2. The method of claim 1, comprising performing the following steps at the transmitting end:
   determining the currently received receiver encoding mode of the second link;
   using a transmitter decoding mode that corresponds to the determined receiver encoding mode; and
   selecting a transmitter encoding mode from the set that depends partially on the determined first measure and partially on the determined receiver encoding mode.

3. The method of claim 1, comprising performing the following steps at the receiving end:
   determining a second measure of the local radio environment at the receiving end; and
   selecting a receiver encoding mode from the set that depends partially on the determined transmitter encoding mode and partially on the determined second measure.

4. The method of claim 1, comprising
   checking an embedded error detection code word and/or error correction code word for each decoded mode; and
   selecting the most likely receiver and/or transmitter decoding mode based on the embedded error detection code word and/or error correction code word as the current decoding mode.

5. The method of claim 1, comprising choosing the receiver and/or transmitter decoding mode that results in decoded speech having the best correlation with previously received and decoded speech.

6. The method of claim 1, comprising decoding only the current receiver and/or transmitter decoding mode and its nearest neighbor modes with lower and higher data protection bit rates, respectively.

7. The method of claim 1, further comprising the step of:
   including a transmitter encoding mode indicator code word in transmissions from the transmitting end,
   wherein the step of trial decoding the received signal further comprises the steps of
      trial decoding the transmitter encoding mode indicator code word in several of the receiver decoding modes to form several estimates of the transmission from the transmitting end;
      trial encoding, in several of the transmitter encoding modes corresponding to the several receiver decoding modes, each of the several estimates of the transmission from the transmitting end to form several estimates of the encoding mode indicator code word; and
   wherein the step of selecting the receiver decoding mode comprises the step of
      comparing the several estimates of the transmitter encoding mode indicator code word with the transmitter encoding mode indicator code word received from the transmitting end, wherein the receiver encoding mode is selected based upon the estimate of the transmitter encoding mode indicator code word which is most similar to the transmitter encoding mode indicator code word received from the transmitting end.

8. The method of claim 1, wherein the receiving end selects a receiver encoding mode on the basis of essentially only the determined transmitter encoding mode.

9. The method of claim 8, wherein the transmitting end comprises a base station.

10. The method of claim 1, wherein the digital cellular radio communication system is a TDMA system.

11. The method of claim 1, wherein the digital cellular radio communication system is a CDMA system.

12. The method of claim 1, wherein the digital cellular radio communication system is a FDMA system.

13. A power control method in a digital cellular radio communication system having traffic channels, at least some of which are associated with a set of speech/channel encoding modes, each mode having a different mix of speech encoder bit rate and data protection bit rate but the same total available gross bit rate, comprising the following steps at a transmitting end of a link using such a traffic channel:

replacing a mode allocated to the channel by another mode in the set having higher or lower data protection bit rate and lower or higher speech encoder bit rate if radio conditions become worse or better and/or traffic load in the system increases or decreases;

identifying the selected encoding mode in a mode indicator field transmitted together with the encoded bits; and reducing or increasing the output power of the traffic channel to a lower or higher level such that an estimated decoded speech quality measure at the receiving end of the link is substantially the same as before the change in radio conditions and/or traffic load.

14. The method of claim 13, comprising the following steps at the receiving end of the link:

estimating the decoded speech quality measure;

requesting a mode change to the transmitting end on a return link from the receiving end to the transmitting end if the estimated decoded speech quality measure has changed more than a predetermined amount; and changing to a decoding mode that corresponds to the new received speech channel encoding mode.

15. The method of claim 14, wherein a requested mode field is transmitted in the return link to identify the encoding mode that is requested by the receiving end.

16. The method of claim 13, comprising the following steps at the transmitting end of the link:

estimating the decoded speech quality measure on a return link from the receiving end to the transmitting end;

using the estimated decoded speech quality measure at the transmitting end as a measure of the estimated decoded speech quality at the receiving end; and changing encoding mode if the estimated decoded speech quality measure at the transmitting end has changed more than a predetermined amount.

17. The method of claim 13, comprising allowing only one of the receiving end and transmitting end to control mode switching.

18. The method of claim 17, comprising allowing only a base station to control mode switching.

19. The method of claim 13, wherein the estimated decoded speech quality measure comprises an estimated decoded bit error rate.

20. The method of claim 13, wherein the digital cellular radio communication system is a TDMA system.

21. A power control method in a digital cellular radio communication system having traffic channels, at least some of which are associated with a set of speech/channel encoding modes, each mode having a different mix of speech encoder bit rate and data protection bit rate but the same total available gross bit rate, comprising performing the following steps at a transmitting end and a receiving end of a link using such a traffic channel:

A. at the transmitting end of the link:

replacing a mode allocated to the channel by another mode in the set having higher or lower data protection bit rate and lower or higher speech encoder bit rate if radio conditions become worse or better and/or traffic load in the system increases or decreases;

identifying the selected encoding mode in a mode indicator field transmitted together with the encoded bits; and reducing or increasing the output power of the traffic channel to a lower or higher level such that an estimated decoded speech quality measure at the receiving end of the link is substantially the same as before the change in radio conditions and/or traffic load;

B. at the receiving end of the link:

decoding the received signal in several decoding modes corresponding to the speech/channel encoding modes; and selecting the decoding mode that is most likely to give the best decoded speech quality as the current decoding mode.

22. A power control system in a digital cellular radio communication system having traffic channels, at least some of which are associated with a set of speech/channel encoding modes, each mode having a different mix of speech encoder bit rate and data protection bit rate but the same total available gross bit rate, comprising the following elements at a transmitting end of a link using such a traffic channel:

means for replacing a mode allocated to the channel by another mode in the set having higher or lower data protection bit rate and lower or higher speech encoder bit rate if radio conditions become worse or better and/or traffic load in the system increases or decreases; and means for including a mode indicator identifying the replacement encoding mode in the bit stream that contains the encoded bits; and means for reducing or increasing the output power of the traffic channel to a lower or higher level such that an estimated decoded speech quality measure at the receiving end of the link is substantially the same as before the change in radio conditions and/or traffic load.

23. The power control system of claim 22, wherein the digital cellular radio communication system is a TDMA system.

24. A power control system in a digital cellular radio communication system having traffic channels, at least some of which are associated with a set of speech/channel encoding modes, each mode having a different mix of speech encoder bit rate and data protection bit rate but the same total available gross bit rate, comprising the following elements at a transmitting end and a receiving end of a link using such a traffic channel:

A. at the transmitting end of the link:

means for replacing a mode allocated to the channel by another mode in the set having higher or lower data protection bit rate and lower or higher speech encoder bit rate if radio conditions become worse or better and/or traffic load in the system increases or decreases; and means for reducing or increasing the output power of the traffic channel to a lower or higher level such that an estimated decoded speech quality measure at the receiving end of the link is substantially the same as before the change in radio conditions and/or traffic load;

B. at the receiving end of the link:

means for decoding the received signal in several decoding modes corresponding to the speech/channel encoding modes; and means for selecting the decoding mode that is most likely to give the best decoded speech quality as the current decoding mode.

* * * * *